United States Patent

[11] 3,566,128

[72] Inventor Jacques A. Arnuad
Matawan Township, Monmouth County, N.J.

[21] Appl. No. 744,264
[22] Filed June 17, 1968
[45] Patented Feb. 23, 1971
[73] Assignee Bell Telephone Laboratories, Incorporated
Murray Hill, Berkeley Heights, N.J.
Continuation-in-part of application Ser. No. 695,446, Jan. 3, 1968, now abandoned.

[54] OPTICAL COMMUNICATION ARRANGEMENT UTILIZING A MULTIMODE OPTICAL REGENERATIVE AMPLIFIER FOR PILOT FREQUENCY AMPLIFICATION
16 Claims, 7 Drawing Figs.

[52] U.S. Cl. .................................................... 250/199, 33/4.3, 331/94.5
[51] Int. Cl. .................................................... H04b 9/00, H01s 3/05
[50] Field of Search .................................................... 259/199, (Inquired); 330/4.3, (Inquired), 332, 7.51, 331, 94.5, 325

[56] References Cited

UNITED STATES PATENTS 3,200,342 8/1965 Kibler .......................... 330/4.3
3,302,120 12/1967 Kluver .......................... 250/199UX

*Primary Examiner*—Robert L. Griffin
*Assistant Examiner*—James A. Brodsky
*Attorneys*—R.J. Guenther and Arthur J. Torsiglier

ABSTRACT: A narrow band laser regenerative amplifier for a multiple-mode optical signal is included in the receiver of an optical transmission system in which a pilot, transmitted together with an information bearing signal, is amplified prior to a detection process in which the amplified pilot is used as the local oscillator.

The resonator of the laser is adapted to resonate at least a majority of the pilot transverse modes at the same frequency. A fully degenerate planar ring embodiment and a Luneburg lens embodiment are also disclosed.

INVENTOR
J. A. ARNAUD
BY Kenneth W. Mateer
ATTORNEY

OPTICAL COMMUNICATION ARRANGEMENT UTILIZING A MULTIMODE OPTICAL REGENERATIVE AMPLIFIER FOR PILOT FREQUENCY AMPLIFICATION

CROSS REFERENCES TO RELATED APPLICATIONS

This is a continuation-in-part of my copending application, Ser. No. 695,446, filed Jan. 3, 1968, and now abandoned, relating to a multimode optical regenerative amplifier.

BACKGROUND OF THE INVENTION

1. Field of the Invention

This invention relates to an optical transmission system employing an optical regenerative laser amplifier exhibiting a narrow band, multiple-mode amplification characteristic.

2. Description of the Prior Art

One major problem encountered in communications over large distances, either from point-to-point on earth or from a point on earth to a celestial station, is phase and amplitude distortion of the energy wavefront due to perturbations either by the atmosphere itself or by system components. In order to realize the desirable signal-to-noise properties of heterodyne detection at the receiver, it is necessary that the local oscillator signal have the same phase and amplitude characteristic as the incoming signal to be detected. When the incoming signal is widely distorted, it becomes extremely difficult to provide a local oscillator having the proper characteristic.

As disclosed in the copending, commonly assigned application of R. Kompfner, Ser. No. 663,692, filed Aug. 28, 1967, the advantage of heterodyne detection can be maintained in an optical system in which an optical pilot of a frequency $p_o$ equal to the local oscillator frequency desired at the receiver station is transmitted along with the information-containing signal. Passing through the transmission medium together, both signal and pilot experience similar perturbations, and both therefore arrive at the receiving station with substantially similar phase and amplitude distortions. Likewise, any distortions introduced by the system components themselves affect both signal and pilot equally. At the receiver, the jointly collected signal and pilot energy pass through amplification means having a gain curve which peaks at the pilot frequency and falls to substantially unity gain—that is, the medium is transparent—for the signal frequencies. Thus amplified, the pilot—now the oscillator wave—and the signal pass to detection means associated with an optical heterodyne receiver.

By virtue of the similarity in phase and amplitude distortion of the signal wave and local oscillator wave, heterodyne detection can be successfully employed. Since the amplitude of the local oscillator wave is large compared with the amplitude of the signal wave, a highly acceptable signal-to-noise ratio is afforded.

Technical problems have been raised by the requirement of the locally amplified pilot scheme for a quantum amplifier with a narrow frequency bandwidth capable of (1) transmitting with negligible attenuation outside the amplification bandwidth, and (2) amplifying substantially equally perhaps thousands of transverse pilot wave modes. A simple laser peaked at the pilot frequency could be used but the system performance would be less than optimum.

Similarly, a quantum amplifier, for example, a nonresonant laser amplifier, followed by a narrow band pilotresonating cavity could be used to obtain more precise performance. However, such a configuration introduces losses at the beam splitters which are necessary to provide a path for the signal around the cavity. In addition, a high gain device would require a long quantum amplification medium which would not accept the relatively wide bundle of scattered pilot wave modes presented for amplification. Furthermore, the high cavity finesse desired would likely require a sequence of cavities, and the noise filtering problems and related amplifier saturation considerations represent substantial shortcomings in such an arrangement.

SUMMARY OF THE INVENTION

In accordance with the present invention, the desired quantum amplification characteristics are realized in a regenerative laser amplifier in which low noise performance is directly related to a narrow amplification bandwidth. More specifically, the resonator of the laser amplifier is adapted to pass multiple transverse modes of the signal nonresonantly with unity gain and to resonate a majority of the transverse modes of the pilot at the same frequency.

In one illustrative embodiment the regenerative amplifier comprises a three-branch, triangular ring resonator arrangement in which one apex comprises an input-output semitransparent, reflective means and the remaining apexes comprise reflectors. Positioned between the second and third apexes is a narrow band optical amplification means such as a laser active medium. Confocal lenses provide beam focusing. Such a planar resonator is degenerate in the ring plane and, as such, would faithfully amplify signals with phasefronts distorted in that plane.

In a preferred embodiment, all of the transverse modes of the pilot are resonated at the same frequency in a fully degenerate planar ring.

In a third illustrative embodiment, full degeneracy for pilot modes is achieved by use of a Luneburg lens in the resonator.

The frequency response, noise relationships, and amplification of such configurations are especially advantageously adapted for use in a locally amplified pilot, optical communication system.

BRIEF DESCRIPTION OF THE DRAWING

The many advantages and attributes of the invention together with the various objects thereof and its mode of operation, can be more readily understood from reference to the accompanying drawings and to the detailed description thereof, in which.

DETAILED DESCRIPTION

Figures 1, 2:
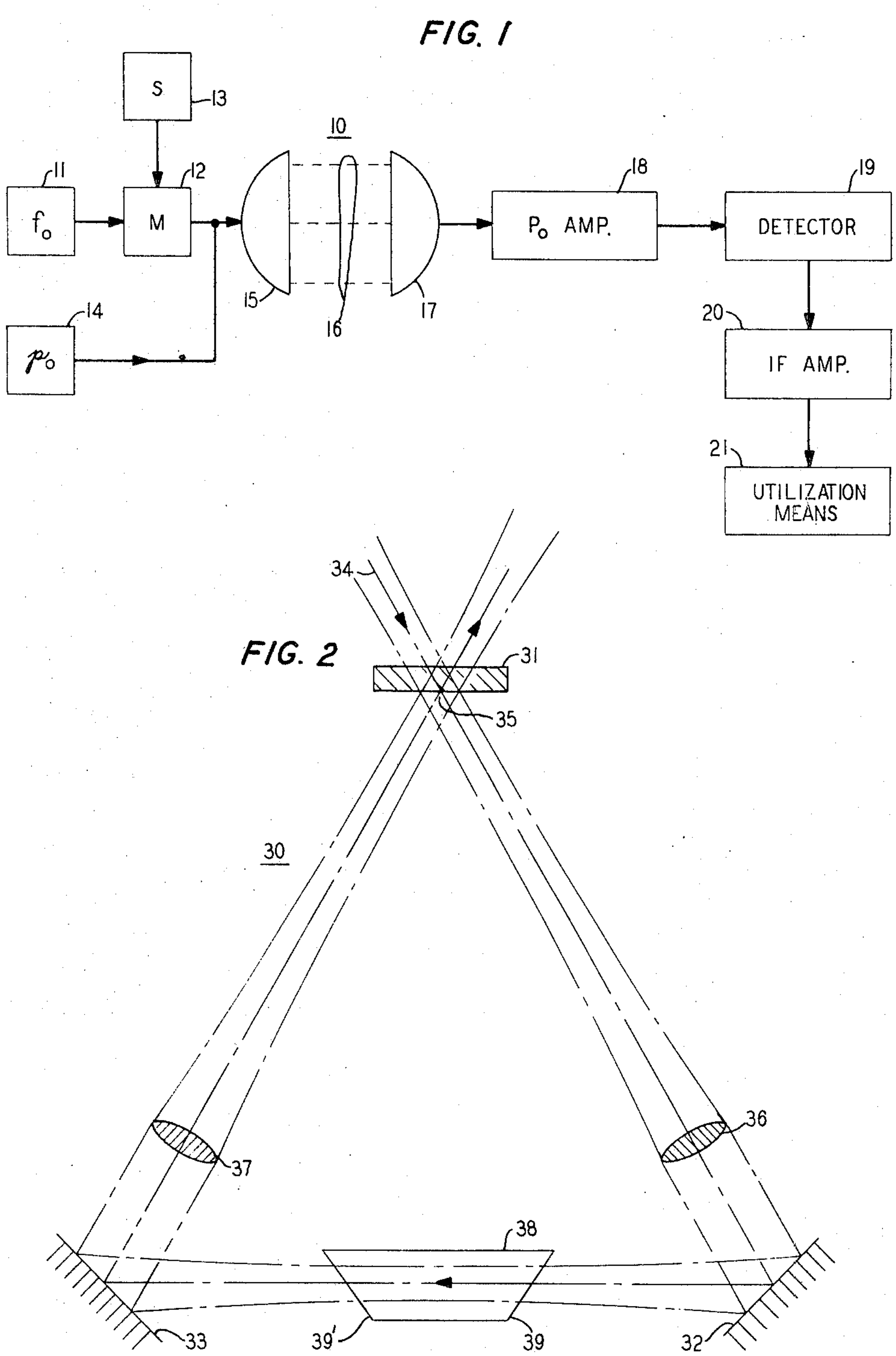
FIG. 1 is a block diagram of an optical system in accordance with the invention.
FIG. 2 is a schematic illustration of a first quantum amplifier for use in the system of FIG. 1.

Referring now in detail to FIG. 1, there is shown an optical transmission system 10 in which a coherent light source 11 of frequency $f_o$ supplies an optical carrier signal to modulation means 12. Simultaneously, information source 13 supplies to modulator 12 an information bearing signal to be transmitted on the carrier. Source 11 can be a laser with modulator 12 situated either outside or inside the laser cavity. One typical internal modulation arrangement is disclosed, for example, in the copending, commonly assigned application of I. P. Kaminow, Ser. No. 379,273, filed Jun. 30, 1964 and now U.S. Pat. No. 3,405,370. A second coherent light source 14 of constant frequency $p_o$, different from $f_o$ by the intermediate frequency desired at the receiving terminal, supplies a pilot which is combined, typically, in a conventional optical hybrid (not shown), with the output of modulator 12 at transmitting means 15. Transmitting means 15 can comprise, for example, an optical lens system emitting a collimated beam of parallel light rays into the atmosphere 16. Alternatively, the transmission from transmitting means 15 to receiving means 17 can be over an enclosed medium such as a series of redirectors, for example, lenses, disposed within a continuous pipe. In FIG. 1, the propagation of signal and pilot is indicated by dashed lines 16 extending between transmitting means 15 and receiving means 17.

For purposes of discussion, we will designate the signal power, including carrier power, at receiving means 17 as $S_o$ and the pilot power at the receiving means 17 as $P_o$. For a direct detection scheme under ideal circumstances a receiver of optical radiation which receives a signal with a mean power $S_o$ will have a signal-to-noise ratio at the detector equal to $S_o$ times the quantum efficiency of the detector, divided by the product of the photon energy times the bandwidth. When the detector is a photomultiplier this S/N ratio can be closely approached with a strong signal even when circumstances are not ideal; when, for example, inhomogeneities in the atmosphere tilt and scramble the signal wavefronts. As long as all the radiation intercepted by the receiving antenna reaches the detector, it does not matter that the distribution of phase and amplitude is chaotic over the detector, since electrons will be emitted everywhere in proportion to the local intensity of radiation.

If the atmosphere were homogeneous, or well behaved, it should in principle be possible to concentrate the received signal radiation into an area $A_o$ dependent only on the tangent of the angle subtended at the detector by the effective antenna aperture radius.

A real atmosphere will perturb the radiation so that on the average, it will occupy an area A which always will be larger than $A_o$. We may express this fact by saying that the signal is now carried by $n$ modes, where $n$ is the ratio between A and $A_o$. As long as the photocathode of the photomultiplier is larger than A, the signal-to-noise ratio remains as described.

When a laser is designed to amplify a plurality of modes, it generates a noise power proportional to the number of modes. At the receiver, any preamplification of the information bearing signal will produce excessive total noise due to the spontaneous emission of the laser. Furthermore, any heterodyne detection system with a local oscillator generated at the receiver would be rendered inoperative by the scrambled phasefront of the received signal and the unscrambled phase of the local oscillator. This latter shortcoming is overcome by transmitting signal and pilot together over the same transmission path.

In accordance with the present inventive principles the received pilot is amplified by quantum amplifier 18 in FIG. 1 before both signal and amplified pilot pass to detector 19 and on to standard intermediate frequency amplifier 20, and thence to utilizing means 21. The quantum amplifier 18, to be more specifically set out and described with reference to the following FIGS. of the drawing, is transparent to the signal carrier frequency, $f_o$. *Thus, the received signal power $S_o$ passes to detector 19 unamplified while the pilot power $P_o$ is substantially increased. At the receiver, the amplified pilot becomes the local oscillator. Such a system is termed a locally amplified pilot heterodyne detection arrangement.*

In general, the amplifier 18 includes laser amplifying apparatus and means disposed about said apparatus for resonating a majority of the transverse modes of the pilot portion at the same frequency.

One species of the quantum pilot amplifier is shown in more detail in FIG. 2. The essential criteria include narrow amplification bandwidth, resonating of a majority of the pilot transverse modes at the same frequency, high gain at that frequency, and transparency to the signal including substantially all of its transverse modes. Tunability is advantageous. The dependence of gain on distance from the amplifier axis should be minimized because such dependence will introduce an amplitude distortion into the amplified pilot wave and will consequently degrade the heterodyne detection process, particularly for higher order modes. Fluctuations of gain with time also should be minimized.

FIG. 2 is a schematic representation of such an optical amplifier 30 in accordance with the principles of the present invention for use as the pilot amplifier in the arrangement of FIG. 1. The amplifier is basically a ring laser amplifier in which plane mirrors 31, 32, and 33 circulate an incoming beam 34 which converges at the surface 35 of mirror 31. Mirror 31, which serves as both input and output interface, can be a half-silvered or dielectric-coated mirror with a reflectance-transmittance characteristic which can be typically 50 percent–50 percent at the pilot frequency, although other ratios can be used. The reflective layers are typically one-quarter wavelength thick at the desired center frequency, here $p_o$, for example mirror 31 is preferably transmissive at the signal frequency $f_o$.

Positioned in each of the nonamplifying arms of the ring are lenses 36,37, which have equal focal lengths which add to equal to their separation along either mean path therebetween; that is, they are confocal. Lenses 36, 37 cause the incident energy, typically in a Gaussian distribution with divergence introduced by diffraction, to become convergent. Positioned between totally reflecting mirrors 32, 33 and symmetrically on the axis of energy reflected therebetween is an amplifying medium shown schematically as laser 38 with Brewster angle interfaces 39, 39′ between the active medium and the surrounding medium. Laser 38 can be of the solid-state type, or gaseous type, depending on the wavelength of the pilot signal and the amplification level desired and, from the schematic representation, is understood to include excitation apparatus and other associated apparatus, except for the resonator, which is shown separately.

As shown in FIG. 2, the lenses 36, 37 and reflectors 31, 32, 33 are arranged such that the length of the ring laser is $4f_o$ where $f_o$ is the focal length of the similar lenses. With the symmetrical positioning depicted, the beam minima, or waists, appear at mirror 31 and at the center of the active medium of laser 38. It should be understood that although preferred, the beam dimension need not be minimum at the reflector 31. In any event, matching lenses are typically employed external to the ring laser.

In the operation of the amplifier of FIG. 2, input radiation comprising both an information bearing signal portion and a portion which is narrow band and of substantially single pilot frequency $p_o$ pass through semitransparent mirror 31 and lens 36, and are reflected from mirror 32 toward and through laser 38 which has an amplification characteristic which peaks at the pilot frequency and falls to unity gain at the signal frequencies. In other words, the medium is transparent at the signal frequencies. This passage, of course, introduces gain for the pilot, and the amplified pilot and the unamplified signal energy are reflected at mirror 33 and proceed, through converging lens 37, toward mirror 31. A portion of the pilot energy passes through semitransparent mirror 31 and proceeds to the subsequent focusing and detection apparatus. The remainder of the pilot energy is reflected at mirror 31 and is recirculated.

At mirror 31, the amplified pilot frequency waves are in phase and therefore add, as circulation around the ring proceeds. The signal waves are, however, not in phase and the ring laser is therefore nearly passive, or transparent, and nonresonant to this radiation. The pilot power gain $g$ of the ring laser can be expressed in terms of the reflectance $R$ of mirror 31, the single-pass pilot power gain $G$ of laser 38 and the total round-trip pilot phase shift $\theta$ as $$g=\frac{(\sqrt{G}-\sqrt{R})^2+4\sqrt{RG}\sin^2\frac{\theta}{2}}{(1-\sqrt{RG})^2+4\sqrt{RG}\sin^2\frac{\theta}{2}} \quad (1)$$

In the (preferred) limit, $\theta$ $o$ and $G >> R$, so that equation (1) simplifies to:

$$g=\frac{\vec{G}}{(1-\sqrt{RG})^2+\sqrt{RG}\theta^2} \quad (2)$$

or, at the resonance ($\theta = o$), $$g = \frac{G}{(1-\sqrt{RG})^2} \qquad (3)$$

As a typical example, the ring structure of FIG. 2 can comprise a helium-xenon laser which amplifies at 3.5 $\mu$. A typical gain for such a laser 110 millimeters long and 8 millimeters inside diameter is 2.78 decibels, and for mirror 31 being 50 percent reflective, the realizable regenerative laser gain would be 35 decibels, with a 3 decibel bandwidth of the order of 3.8 megahertz. The acceptance angle at the input mirror is of the order of 22 minutes of arc, and the fundamental mode radius at the beam waist at the center of laser 38 is 0.41 millimeters. Optical quality lenses would be sufficient for applications in this wavelength range.

The amplification of a narrow band pilot signal prior to detection, as in the locally amplified pilot arrangement of FIG. 1, is particularly attractive in the infrared range, for which no highly efficient detector exists. It is known that the background radiation of the earth and of the sun together reach a minimum around 3.5 $\mu$. This wavelength also corresponds to a window in a clear atmosphere. Thus, the helium-xenon laser, with an exact frequency of 3.508 $\mu$ for a large gain transition, is particularly attractive for use in an atmospheric optical communication system. The noise properties of such a laser are fully set forth in an article by W. J. Kluver, entitled "Laser Amplifier Noise at 3.5 Microns in Helium-Xenon," Volume 37 of the Journal of Applied Physics, beginning at page 2,987. To obtain suitable amplification in the regenerative amplifier structure of FIG. 2, the discharge tube diameter of laser 38 must be large enough to eliminate appreciable transverse variation of the complex gain within the area occupied by the optical beam to be amplified. From analysis of the noise powers involved in the amplifier and subsequent detector, and using a gold-doped germanium detector, with 2,000 transverse modes to be amplified, the optimum performance of the locally amplified pilot is obtained for a quantum amplifier output power of 125 milliwatts. Typical improvement in signal-to-noise ratio would be 11 decibels. Such an arrangement can be shown to be of considerably higher performance than a system in which the signal itself is amplified in a broadband amplifier prior to detection.

The regenerative amplifier described above can also comprise a $CO_2$ laser operating at 10.6 $\mu$. Such a laser is particularly attractive if higher power levels were required.

It is important for effective operation that as many pilot transverse modes as possible resonate at the same frequency in the ring resonator. In the typical confocal spherical mirror resonator of the prior art, one-half of the resonated transverse modes (the even modes, for instance) resonate at the same frequency. In the ring resonator of FIG. 2, three-quarters of the resonated modes resonate at the same frequency. That is, all modes in the plane of the ring and one-half the even modes in the orthogonal plane including a segment of the beam path resonate at the same frequency. The ring would be said to be fully degenerate if all the resonated transverse modes were resonated at the same frequency.

Figure 3:
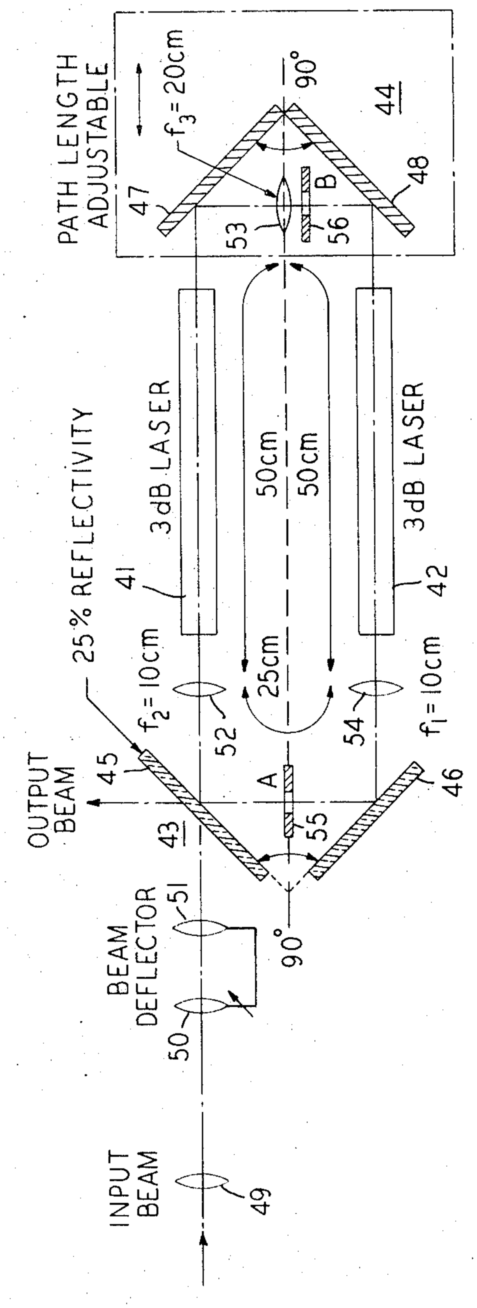
FIG. 3 is a partially schematic and partially pictorial illustration of a preferred embodiment of the invention.
Figure 4:
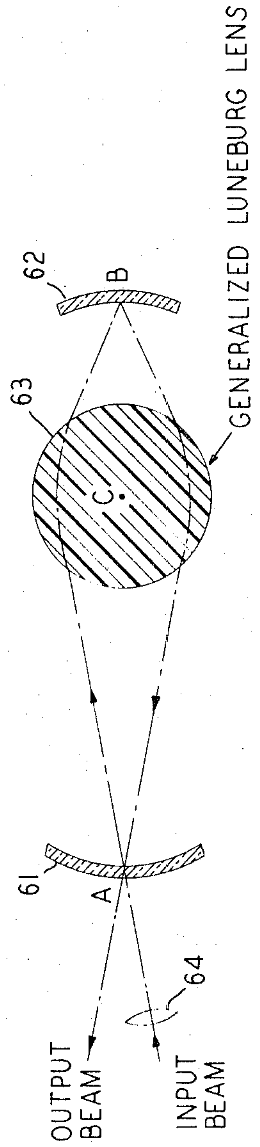
FIG. 4 is a partially schematic and partially pictorial illustration of another embodiment of the invention employing a Luneburg lens.
Figure 5:
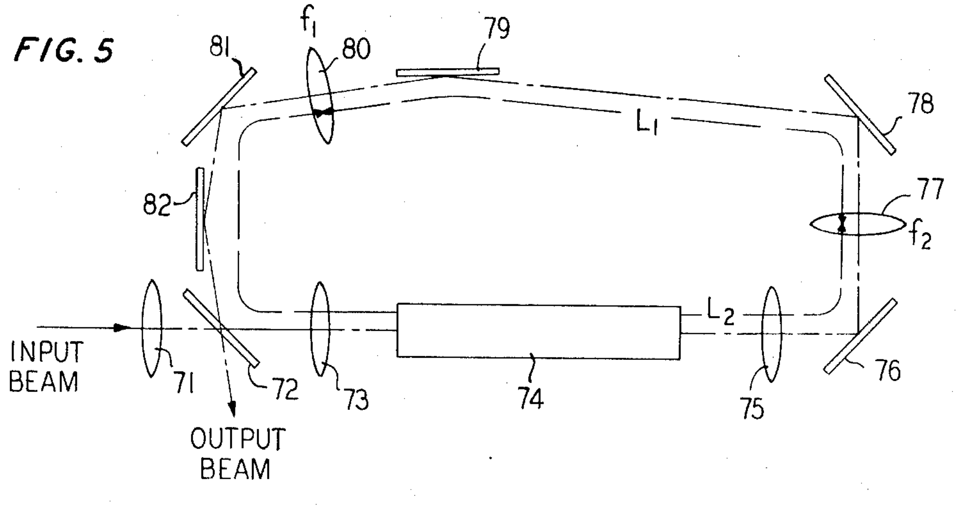
FIG. 5 is a partially schematic and partially pictorial illustration of a fully degenerate ring embodiment employing confocal lenses and planar mirrors.

While a few fully degenerate resonators in the so-called linear configuration are known, their performances with respect to noise, stability and attenuation of sidebands are readily surpassed by the performances of the ring embodiments of FIGS. 2, 3 and 5, and the Luneburg lens embodiment of FIG. 4.

In the fully degenerate regenerative ring laser pilot amplifier of FIG. 3, the schematically shown 3.5 $\mu$ helium-xenon lasers 41 and 42, each preferably having 3 db. gain, are symmetrically disposed between two 90° rooftop reflectors 43 and 44 including pairs of leaves 45, 46 and 47, 48 respectively. The rooftop edges are parallel, so that a planar ring is formed. Leaf 45 is 25 percent reflective for the pilot frequency and substantially fully transmissive for all signal frequencies. The entrance of the input signal and pilot beams into the ring resonator is controlled by lens 49 and laterally movable beam positioning lenses 50 and 51.

Full degeneracy is obtained in the embodiment of FIG. 3 by a nonconfocal spacing of three lenses 52, 53 and 54, thereby saving one lens. It will be seen that twice the sum of the focal lengths of these lenses is less than the total path length in the resonator.

In general, the separations of the focal points of the lenses are related to the focal lengths as follows; the separation $c_{12}$ between the focal points of the lenses of focal lengths $f_1$ and $f_2$ is $$c_{12} = \frac{f_1 f_2}{f_3} \qquad (4)$$

where $f_3$ is the focal length of the third lens. Similarly, $$c_{23} = \frac{f_2 f_3}{f_1}, \text{ aud} \qquad (5)$$

$$c_{31} = \frac{f_3 f_1}{f_2} \qquad (6)$$

If we associate $f_1$ (10 cm.), $f_2$ (20 cm.) and $f_3$ (10 cm.) with lenses 52, 53 and 54 respectively, then $$c_{12} = \frac{10 \times 20}{10} \text{ centimeter}$$

which is also equal to 50 − (20 + 10) centimeters;

$$c_{23} = \frac{10 \times 20}{10} \text{ centimeter,}$$

also equal to 50 − (20 + 10) and $$c_{31} = \frac{10 \times 10}{20} \text{ centimeter}$$

equal to 25 − (10 + 10), where the actual separation of focal points is found from the differences of indicated path lengths and focal lengths in FIG. 3.

In the absence of noise filtering apertures 55 and 56, the embodiment of FIG. 3 would also be relatively insensitive to lateral displacement of the input beams because of the degeneracy of the resonator. Nevertheless, filtering apertures are desirable to eliminate those transverse pilot modes so low in level that the lasers 41 and 42 contribute more noise in those modes than amplified signal in those modes. Thus, the apertures 55 and 56 are opened wide enough to pass about 1,000 transverse pilot modes. If 2,000 modes or more transverse pilot modes were received, the weakest ones are eliminated in order to avoid the optical noise generated by the lasers in the same modes.

In the Luneburg lens embodiment of FIG. 4, the resonator is formed by spherical reflectors 61 and 62 having their centers of curvature at C at the center of the generalized Luneburg lens 63. This resonator can be called a ring resonator in the respect that input and output beams can be separated in direction because of the negligible aberrations of lens 63. Nevertheless, it is akin to a linear resonator in that it requires only two reflectors.

Luneburg lens 63 has an index of refraction $n$ that varies with distance, $r$, from its center according to the general equations $$n = e^{w(nr, r_0) + w(nr, r_1)} \qquad (7)$$

$$r + nre^{-w(nr, r_0) - w(nr, r_1)}, \qquad (8)$$

where $r_o$ is axial distance AC from the apparent point of origin A of the rays focused to point B and $r_1$ is the axial distance CB point C to the point B toward which the rays are focused. Also, $w(nr, r_o)$ and $w(nr, r_1)$ are functions which, in the case of the embodiment of FIG. 4, depend upon the values of $r_o$ and $r_1$ set by reflectors 61 and 62. Derivations of the functions $w(nr, r_o)$ and $w(nr, r_1)$, for various types of cases, may be found in the article by A. Fletcher et al., "Solutions of Two Optical Problems", Proceedings of the Royal Society, London, A223 (1954) page 216 at 219 forward, especially equation (14) and table I therein.

The variation of index of refraction, $n$, in lens 63 can be derived in the following manner:

Consider the special case where $r_o=r_1=1$ in equations (7) and (11) of Fletcher, where units are chosen so that the radius of lens 63 is unity, we get $$ln(n)=2\times\frac{1}{2}\ ln\{1+\sqrt{1-(nr)^2}\} \quad (9)$$

$$n=1+\sqrt{1-n^2r^2} \quad (10)$$

$$(n-1)^2=1-n^2r^2 \quad (11)$$

$$n^2-2n=-n^2r^2 \quad (12)$$

$$n=o; \quad (13)$$

$$n=\frac{2}{1+r^2}, \quad (13A)$$

which is the Maxwell fisheye restricted so that reflectors 61 and 62 are on the surface of lens 63.

Next consider the separated reflector arrangement illustrated where $r_o=10$ and $r_1=5$. We can limit ourself to the first term of the expression of equation (14) of Fletcher et al., and take $$n\cong exp\ c_0(p)\left(\frac{1}{r_o}+\frac{1}{r_1}\right) \quad (14)$$

$$(p\equiv nr) \quad (15) \quad (15)$$

The error is less than 1 percent of $(n-1)$.

Then we get, from table I of Fletcher

| | | | | | | | | |
|---|---|---|---|---|---|---|---|---|
| $r$ | $o$ | | 0.29 | 0.41 | 0.625 | 0.795 | 0.928 | 1 |
| $n$ | 1 | 1.0985 | 1.094 | 1.088 | 1.075 | 1.052 | 1.029 | 1 |

Since $n$ is close to 1 when $r_o$ and $r_1$ are large, and since we have $c_o(p)=\sqrt{1-p^2}/\pi$, we can expand further the above expression for $n$, when $r_o$ and $r_1$ are much larger than unity, as follows ($p\cong r$)

$$n\simeq l+\sqrt{\frac{1-r^2}{\pi}}\left(\frac{1}{r_o}+\frac{1}{r_1}\right), \quad (16)$$

where it is recalled that $r$ is the radial distance from the center of lens 63 to the point where that index of refraction $n$ exists.

Refraction indexes of the order of 1 to 1.1 are feasible at microwaves and millimeter wavelengths (with artificial dielectrics, for instance). Therefore, I prefer to use millimeter-wave signal and pilot waves in the embodiment of FIG. 4.

In the embodiment of FIG. 5, a fully degenerate planar ring employs four confocal lenses 73, 75, 77 and 80 and six planar reflectors 72, 76, 78, 79, 81 and 82. This embodiment, in which the laser amplifying apparatus 73 is shown schematically, is an example of the general case in which full degeneracy is obtained because both $N$ and $M/2$ are even, where $N$ is the number of planar mirrors and $M$ is the number of lenses. The relationship applies only when the lenses are confocally spaced in both directions around the ring and are of equal focal length $f$. All resonated transverse modes are resonated at the same frequency.

Reflector 72 is made partially transmissive for the signal and pilot frequencies, typically 50 percent. The input beam passes through lens 71 before entering the resonator through reflector 72.

Figure 6:
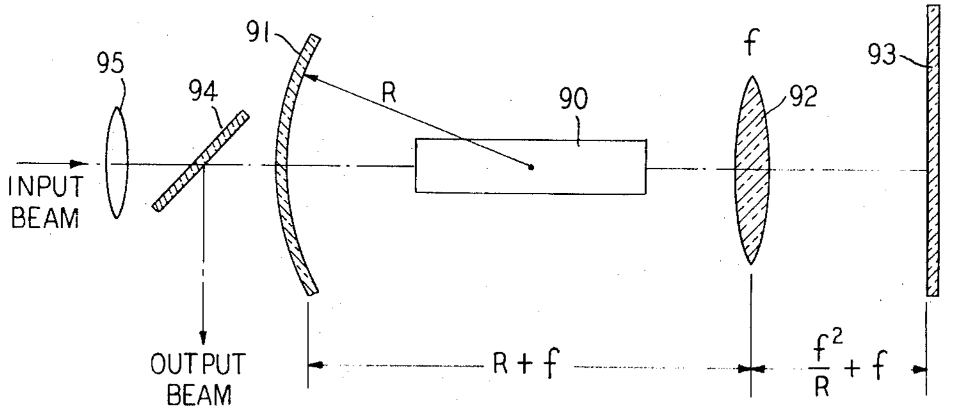
FIG. 6 is a partially schematic and partially pictorial illustration of a new linear resonator especially adapted according to my invention.

In the linear resonator embodiment of FIG. 6, a fully degenerate resonator is formed around the laser amplifying apparatus 90, shown schematically, by the spherical reflector 91 of radius of curvature $R$, the planar reflector 93 and the lens 92 of focal length $f$. The separation of spherical reflector 91 and lens 92 is equal to $R+f$; and the separation of lens 92 and planar reflector 93 is $$\frac{f^2}{R}+f.$$

Reflector 91 is made partially reflective. Both portions of the input beam pass through beam splitter 94 prior to passing through reflector 91.

All of the resonated modes, namely, the pilot transverse modes, are resonated at the same frequency. In addition, the degenerate resonator of this amplifier has the advantage over the prior art degenerate linear resonators that it employs only one curved reflector instead of two. In general, planar reflector 93 can be more precisely made, and thus reflect a multiplicity of transverse modes better, than a curved reflector. Moreover, the spacings illustrated are not special cases of spacings for the aforesaid prior art degenerate resonators.

Figure 7:
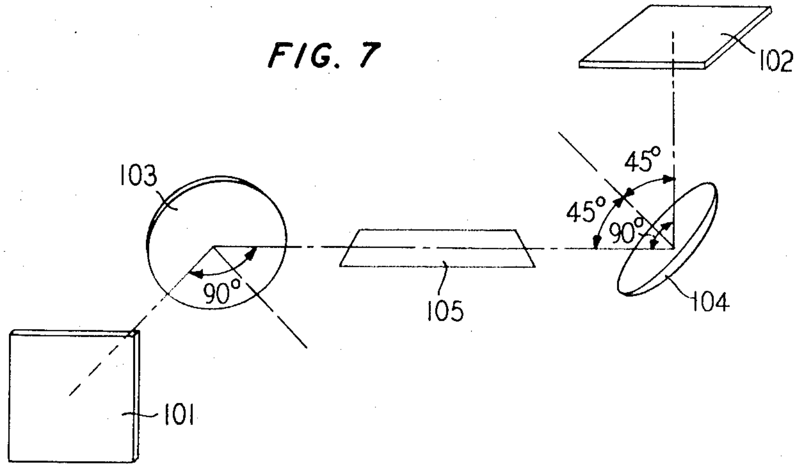
FIG. 7 is a partially schematic and partially pictorial illustration of a nonplanar linear resonator according to my invention.

In the embodiment of FIG. 7, a nonplanar linear resonator is formed including planar end reflectors 101 and 102. Focusing spherical reflectors 103 and 104 are disposed therebetween to bend the light path through 90° angles. Their separations, 0.424 times their radii in the pertinent planes, from the end reflectors 101 and 102, respectively, are less than half their mutual separation, 1.06 times their equal radii. The plane 101-103-104 is perpendicular to the plane 103-104-102; and the incidence angle on the two spherical mirrors is $\pi/4$ (45°). Reflectors 103 and 104 focus like the thin lenses of the previous embodiments. The astigmatism of the spherical mirrors (under large incidence angles) is taken into account in this configuration.

In all cases it is understood that the above-described arrangements are only illustrative of the principles of the invention. Numerous and varied other arrangements could be devised by those skilled in the art without departing from the spirit and scope of the invention. Thus, for example, although the specific embodiment described with reference to FIG. 1 included a first carrier $f_o$ and a pilot $p_o$ different from $f_o$, the frequency $f_o$ could itself equally well take the place of a frequency-spaced pilot. In such an arrangement, the information-bearing signal is the sideband energy, and the pilot is the carrier. All of the requirements set out for multimode amplification must, of course, still be met, with the carrier-frequency power being augmented at the receiver.

I claim:

1. An optical communication arrangement comprising in combination:

means for admitting optical electromagnetic radiation including an information-bearing signal portion having a plurality of transverse modes and an unmodulated pilot portion having a plurality of transverse modes of substantially narrower bandwidth than said signal portion; and means for amplifying said pilot portion and passing substantially all of said signal portion with unity gain, said amplifying means intercepting said radiation and comprising: laser amplifying apparatus, and means disposed about said apparatus and including at least one lens for resonating a majority of the transverse modes of the pilot portion at the same frequency, whereby said amplified pilot portion is useful as a local oscillator signal.

2. An optical communication arrangement according to claim 1 in which the resonating means comprises a resonator including at least one planar reflector.

3. An optical communication arrangement according to claim 1 in which the resonating means comprises a ring resonator.

4. An optical communication arrangement according to claim 3 in which the ring resonator includes at least one planar reflector.

5. An optical communication arrangement according to claim 3 in which the ring resonator includes a Luneburg lens.

6. An optical communication arrangement according to claim 1 in which the resonating means comprises a three-arm ring resonator.

7. An optical communication arrangement according to claim 6 in which the three-arm ring resonator comprises:

first, second and third reflectors;

said first reflector being partially transmissive and said second and third reflectors being substantially totally reflective;

the laser amplifying apparatus including an active medium disposed in the arm defined between the two substantially totally reflective reflectors; and a pair of lenses, one disposed in each of the remaining two arms, said lenses being confocally spaced in both directions around said ring resonator.

8. An optical communication arrangement according to claim 1 including heterodyne means for detecting the optical electromagnetic radiation after amplification of said pilot portion.

9. An optical communication arrangement according to claim 1 in which the resonating means includes a plurality of planar reflectors forming a planar ring resonator and a plurality of lenses separated around the path of said ring resonator from each other by distances at least as great as the sum of the focal lengths of adjacent lenses.

10. An optical communication arrangement according to claim 9 in which the plurality of planar reflectors include two rooftop reflectors having parallel rooftop edges.

11. An optical communication arrangement according to claim 9 in which:

the plurality of planar reflectors include at least four reflectors; and the plurality of lenses include three lenses characterized by respective focal lengths $f_1$, $f_2$ and $f_3$, adjacent pairs of said lenses having adjacent focal points separate around the path of said ring resonator by distances $c_{12}$, $c_{23}$ and $c_{31}$, respectively, equal to $$\frac{f_1 f_2}{f_3}, \frac{f_2 f_3}{f_1} \text{ and } \frac{f_3 f_1}{f_2}$$

12. An optical communication arrangement according to claim 9 in which:

the plurality $M$ of lenses of equal focal lengths are confocally spaced around the path of the ring resonator; and the plurality of planar reflectors is $N$, where $N$ and $M/2$ are both even integers.

13. An optical communication arrangement according to claim 1 in which the resonating means includes concentrically spaced curved reflectors and a Luneburg lens comprising a sphere of dielectric material centered at the common center of curvature of said reflectors.

14. An optical communication arrangement according to claim 13 in which the admitting means is adapted to direct the radiation into said resonating means oblique to the common axis of the reflectors and Luneburg lens, whereby said resonating means is enabled to function as a ring resonator.

15. An optical communication arrangement according to claim 1 in which:

the resonating means includes one planar reflector and one curved reflector of radius $R$; and the lens in said resonating means having focal length $f$ and being spaced from said curved reflector by $R+f$ and from said planar reflector by $$\frac{f^2}{R}+f.$$

16. An optical communication arrangement according to claim 1 in which the resonating means includes two planar reflectors and two spherical reflectors disposed to receive light from the planar reflectors under an incidence angle of 45° in two perpendicular planes, said spherical reflectors being separated by 1.06 times their common radii, each spherical reflector and the closest planar reflector being separated by 0.424 times the radius of the spherical reflector.